Sept. 28, 1926.
H. D. NYBERG
GALVANIC CELL WITH AUTOMATIC DEPOLARIZATION
Filed May 23, 1922
1,601,036
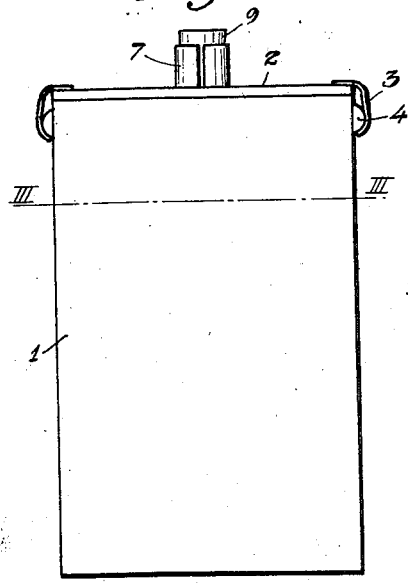
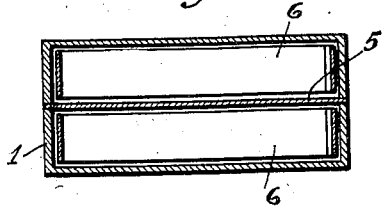
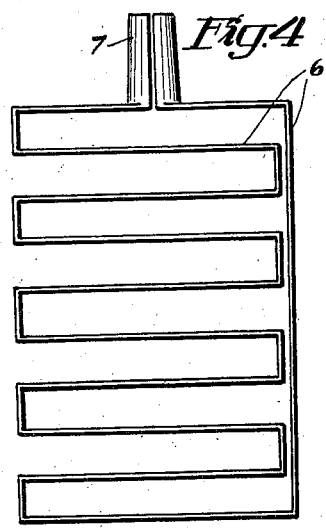
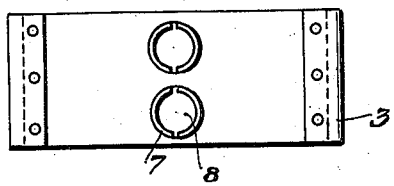
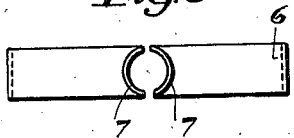
Inventor:-
H.D.Nyberg
By Marks & Clerk
Atty's Patented Sept. 28, 1926.

1,601,036

UNITED STATES PATENT OFFICE.

HERMAN DOUGLAS NYBERG, OF NORRKOPING, SWEDEN.

GALVANIC CELL WITH AUTOMATIC DEPOLARIZATION.

Application filed May 23, 1922, Serial No. 563,156, and in Sweden June 14, 1921.

In the construction of galvanic cells with automatic gas depolarization it has been impossible hitherto to provide a cell with great efficiency, chiefly due to the difficulty of procuring a sufficiently active depolarization.

In one kind of cells of the said type, before known, a central inner electrode of porous carbon, prepared in a special manner, is provided in an outer vessel, through which carbon the gas depolarization takes place. To such an inner central carbon electrode, however, comparatively small dimensions must be given in respect of the outer vessel, which results in the contact surfaces of the electrode with the air or any other gas as well as with the electrolyte being comparatively small and the gas depolarization, in consequence thereof, being rather slight. For that reason cells of the said type by a long way do not permit such a great load as with respect to the total size of the cell would be gained, if an effective gas depolarization was effected.

For that reason stress must be laid upon the arranging of the carbon electrode in such manner, that it gets the greatest possible contact surface with the depolarizing gas (air) as well as with the electrolyte. This is effected, according to the present invention, in the first place by arranging the carbon electrode as an outer vessel for the other parts constituting the cell.

Efforts in the said direction have been previously made, but have been unsuccessful due to the fact that the liquid electrolyte is forced by the hydrostatic pressure through the pores of the carbon, the depolarization being then rendered perfectly impossible (see German Patent No. 81,978, page 1, column 2, lines 12 and 13). For the removing of the said disadvantage a pastelike electrolyte must be used according to the said patent, which by a porous cylinder of clay is separated from the outer carbon electrode. Consequently, in this case the carbon electrode does not constitute a vessel for the electrolyte but it is the porous clay cylinder which contains the same.

Thus, one has not succeeded in using really liquid electrolyte in cells, in which the carbon electrode serves directly as an outer vessel, the liquid electrolyte being, however, of the greatest importance for the maintaining of a voltage as constant as possible, owing to the fact that the generated injurious products of decomposition then get the opportunity of diffusing very easily from the electrodes respectively, in consequence whereof the original greatest voltage of the cell may be maintained more perfectly during the operation of the cell. This, however, is impossible when pastelike electrolyte is used, because the diffusion then takes place with great difficulty.

According to this invention it is possible in galvanic cells of the type stated to use a carbon electrode, serving as an outer vessel, in combination even with a perfectly liquid electrolyte and thus to gain an effective, automatic gas depolarization, which in its turn renders possible the increasing of the efficiency of the cell in the greatest possible degree, while a constant voltage is maintained. The said result is gained by the active walls of the outer carbon-vessel comprising two or more mutually cohering layers, located side by side, one of the said layers which is in contact with the electrolyte being wet by the same so that the electrolyte can penetrate into its pores, while the layer of carbon bordering upon said layer contains one or more substances which in the greatest possible degree can prevent the electrolyte from permeating the carbon electrode. The said penetrating of the electrolyte for a certain depth into the pores of the inner surface of the carbon is of the greatest importance owing to the considerable increasing of the contact surface between the electrode and the electrolyte which partly facilitates the transition of the current partly results in the great quantities of depolarizing gas, which have penetrated into the pores of the carbon from the outside, entering into contact with the great total surface of the electrolyte contained in the said pores, in consequence whereof the depolarizing operation becomes very effective. Thus, further increased contact surfaces are gained in addition to the increasing of the same resulting from the arrangement of the cell stated above. The depolarization may be further promoted by the presence of a catalytic substance at the boundary surface between the electrolyte and the depolarizing gas.

Examples of suitable catalysts are caustic alkalie, oxides or hydroxides of the heavy metals having several valencies such as manganese.

In the manufacturing of a cell of the fundamental nature stated above i. e. a cell having a layer, which borders upon the electrolyte and is wet by the same, and a directly subsequent layer not wet by the electrolyte (outside which layer, evidently, one or more layers of an arbitrary nature in the respects mentioned above may be provided) one may, evidently proceed in different manners.

Thus, in the manufacturing of a cell, according to this invention one may wholly or partially use a known, minutely divided shapable mixture, containing chiefly solid organic substances, such as carbon in the state of coke, anthracite etc. and more or less liquid matters of a more or less fat nature such as tar, if wanted in combination with other substances such as silicates, which are able to prevent the electrolyte from forcing its way out through the carbon. After the vessel has been shaped in due manner and, if wanted, dried, it is heated to sufficient high temperatures for the procuring of a good conducting capacity, for instance 600° centigrade or more. In order that the active walls of the vessel may get the nature stated above, in case of a fat substance being used, one may proceed, according to this invention, in such manner that the maximum temperature and the period of heating are so adapted, that the fat substance is not burnt away from the whole body but only at its surfaces, a fat layer, not permitting the electrolyte to permeate, being left at the central zone of the cross section of the wall of the vessel, while a layer, which is free from fat and into which the electrolyte may penetrate, exists at the innner surface of the wall. The said method may be modified in such manner, that the fat substance used for the producing of the material, is burnt away completely or partially from the walls of the vessel and the latter are then impregnated with fat substance, such as paraffin, in a suitable state of aggregation, which, after the evaporating of the solvent, if any, is completely or for its greatest part removed at the inner surface and for a certain depth, for instance by subjecting the said surface during a certain period to heat of a temperature higher than the melting point of the fat substance, which heat, preferably, is supplied by means of a liquid (water, solution of salt, diluted hydrochloric acid and so on), heated to the said temperature.

A further modification consists in this that the carbon vessel, after the fat substance, used for the producing of the material, has been burnt away completely or partially, is impregnated with fat substance at its outer side and for a certain depth, so that there is a layer free from fat at the inner side of the vessel.

Instead of removing the impregnating substance existing in a layer at the inner side of the vessel, the latter may be manufactured from two different materials located in layers, the inner one of which, facing the electrolyte, is wet by the same, while the other one is such, that it is not wet by the electrolyte and consequently prevents the same from permeating. The said character may be imparted to the material last mentioned by adding to the carbon bulk, during the preparing of same, consequently previously to the burning operation, a substance, such as a silicate or the like, which impart to the material the nature of not being wet by the electrolyte.

Though the invention is applicable most closely to liquid electrolyte, including in this connection electrolytes of any consistency, which permits the electrolyte to be poured, also paste like electrolytes may be used, however, with an inferior result. In the present case changeable as well as unchangeable electrolyte may be used, the latter being, however, preferred.

In the practical execution of the invention the carbon vessel, preferably, is divided into two or more sections, in horizontal or vertical direction and in such manner, that two or more compartments are gained, separated by insulating partition walls. Owing to the said arrangement the cell may be considered divided into two or more small cells. In practice the dividing of the cell into two parts by a vertical section and thus only one partition wall probably will be necessary. By the said dividing of the cell and by connecting the sub-cells in series partly a double voltage per unit of weight partly an increasing of the practically available capacity, in comparison with an undivided cell of the same size, is gained, the said increasing being greater than the amount corresponding to the dividing of the electrolyte into halves. The fact is that for each application of the cell only the cell voltage may be practically utilized, which exceeds a certain lower limit.

The form of execution of the invention last mentioned is illustrated as an example in the accompanying drawing, in which Fig. 1 is a side view and Fig. 2 a plan view of the cell. Fig. 3 is a section on the line III—III of Fig. 1. Figs. 4 and 5 are a side view and a plan view respectively of the zinc electrode.

The carbon vessel, which is parallelopipedical according to the drawing, is designated with 1 and its cover with 2. The said cover is fixed to flanges, lugs, notches or the like by locking members such as hooks 3 or the like. Between the cover and the top edge of the vessel or the top edges of the vessels a tightening, preferably elastic substance is provided. The vessel is divided into two parts, as shown in Fig. 3, and between the said parts a wall 5 of an insulating material, for instance pasteboard impregnated in a special manner is provided, fitting tightly to the parts. By the said arrangements two compartments are provided in the vessel, each containing a zinc electrode 6 and electrolyte. The said zinc electrode may be grid shaped or comprise a number of substantially horizontal parts. Owing to this arangement the composition of the electrolyte at the top and the bottom of the cell will remain as uniform as possible, which prevents the creating of local currents, which would result in the zinc being decayed. Moreover, the zinc is protected against injurious action of substances leaving the other electrode. Preferably, the zinc electrode is shaped as shown in Fig. 4, the top parts 7, 7 located close to each other, being semicircular, Fig. 5, and, if wanted, connected by soldering or the joints being made tight in any other suitable manner, so that the said parts form together a cylindrical or, it may be, somewhat conical hollow projection, extending through an opening 8 in the cover, Figs. 1 and 2. Owing to the said arrangement the zinc electrode fits snugly to the cover and besides the said projection, which may be closed by a cork, forms a handle, facilitating the inserting and the removing of the electrode. The said projection may be screw threaded or covered with some elastic substance. The object of arranging in the described manner the electrode, which is consumed, is to facilitate the renewal of same. The arrangements described above are, evidently, applicable also to undivided vessels. A zinc electrode, which is provided with a hollow projection, made in a single piece and acts in the same manner, may be procured by casting.

At the renewal of the cell the same carbon electrode may be used, only the electrolyte and the zinc electrode being renewed. The said renewal is easily effected according to this invention by disengaging the hooks 3, removing the cover, taking out the zinc electrode and pouring off the electrolyte. Fresh electrolyte is then poured into the vessel, new zinc electrodes mounted into the same, the cover located in its place, if necessary together with fresh tightening substance, the hooks brought into acting position and the cork inserted. The joints between the edges of the opening 8 and the projections 7 may, if necessary, be tightened by means of wax, paraffin or the like. By rendering the projection somewhat conical no such tightening is necessary.

The bottom of the vessel, through which no air depolarization can take place, must not have the character of the carbon described above and may, if wanted, be made of a material other than carbon, like any other part, inactive in depolarizing respect.

In the manufacturing of the vessel each part may be manufactured separately or the vessel may be made in the ordinary manner and then cut into two parts.

For connection with the conductor, preferably a part of the carbon substance forming the vessel is covered with metal in an electro-chemical or any other manner.

In order to still more reduce the evaporation of the electrolyte one or preferably two or three cells together are provided with a coating or a casing of such a nature that in spite of the same air is sufficiently admitted to the cell. If a gas other than air is used as depolarizing medium, the casing etc. evidently must be such, that the said gas does not permeate the walls of the same.

I claim:

1. Galvanic cell with automatic gas depolarization, comprising in combination an electrolyte, an electropositive electrode, and an electronegative electrode, said electronegative electrode consisting substantially of porous carbon and forming a receptacle for said electrolyte and said positive electrode and the boundary walls of the same comprising two mutually cohering layers both consisting substantially of carbon, one of said layers which is in contact with the electrolyte being adapted to be wet by the electrolyte, so that the latter may penetrate into the pores of said layer, while the other layer, which is conductor for electricity is impregnated with substances adapted to prevent the electrolyte from penetrating but permit the air to enter therethrough in order to act as a depolarizer.

2. Galvanic cell of the kind set forth comprising, in combination, an electrolyte, an electropositive electrode, an electronegative electrode, said negative electrode forming a receptacle for said electrolyte and said positive electrode, said negative electrode comprising two mutually cohering layers of different materials, the inner layer, which is in contact with the electrolyte, comprising porous carbon and being adapted to be wet by the electrolyte, while the outer layer consists of an electrically conductive material impermeable to the electrolyte but permeable to air.

3. Galvanic cell of the kind set forth comprising, in combination, an electrolyte, an electropositive electrode, an electronegative electrode, said negative electrode forming a receptacle for the electrolyte and said positive electrode, said negative electrode comprising two layers, the inner layer which is in contact with the electrolyte being permeable to the electrolyte and the outer layer being impermeable to the electrolyte but permeable to air.

4. Galvanic cell of the kind set forth, comprising, in combination, an electrolyte, an electropositive electrode and an electronegative electrode, said negative electrode, consisting substantially of porous carbon and forming a receptacle for the electrolyte and for said positive electrode, the walls of the negative electrode comprising two mutually cohering layers, the inner one of said layers, which is in contact with the electrolyte being adapted to be wet by the electrolyte so as to permit the same to penetrate into its pores, while the outer layer is impregnated with substances adapted to prevent the electrolyte from penetrating but permit the air to enter therethrough, the contact zone between said inner and outer layer containing a catalytic substance for depolarization.

5. Galvanic cell with automatic gas depolarization, comprising, in combination, an electrolyte, an electropositive electrode, and an electronegative electrode, said negative electrode forming a receptacle for the electrolyte and the positive electrode, the side walls of said receptacle comprising two mutually cohering layers both consisting substantially of carbon, one of said layers, which is in contact with the electrolyte, being adapted to be wet by the electrolyte, so that the latter may penetrate into the pores of said layer, while the other layer being electrically conductive and is impregnated with substances adapted to prevent the electrolyte from penetrating said layer but permit the air to enter therethrough in order to act as a depolarizer.

6. A galvanic cell with automatic gas depolarization comprising, in combination, an electrolyte, an electropositive electrode, an electronegative electrode, one of said electrodes being exposed to a depolarizing gas at one of its surfaces and to the electrolyte at another of its surfaces, said electrode being permeable to said gas, said surface in contact with the electrolyte being permeable to the electrolyte and said surface exposed to said gas being impermeable to said electrolyte.

In testimony whereof I have affixed my signature.

HERMAN DOUGLAS NYBERG.